April 5, 1960　　　J. TEERLINK　　　2,931,094
METHOD OF MAKING A SPROCKET
Filed July 29, 1957　　　　　　　　3 Sheets-Sheet 1
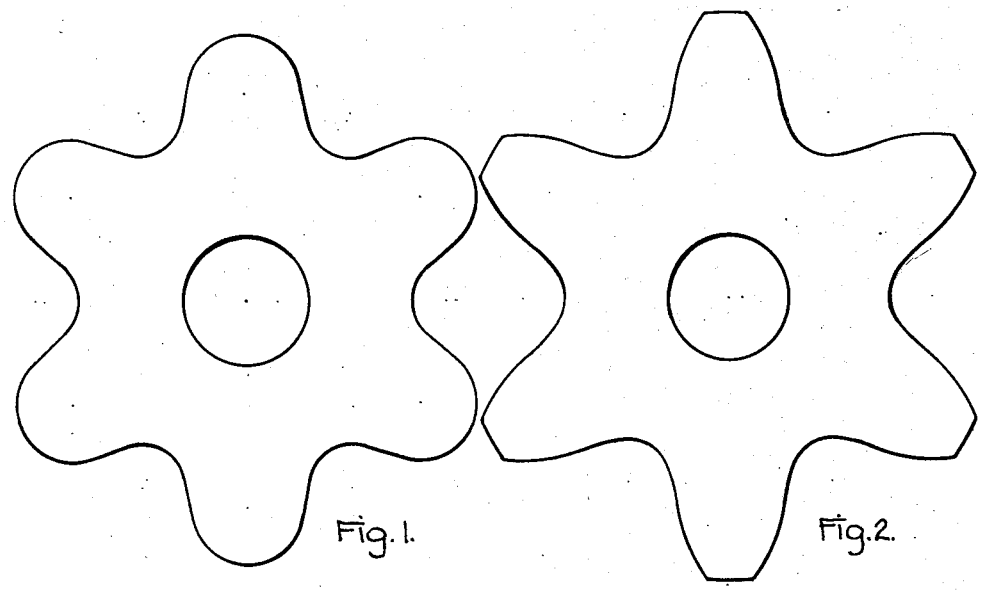
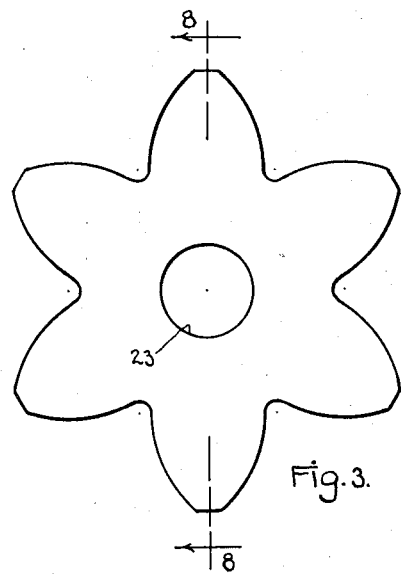
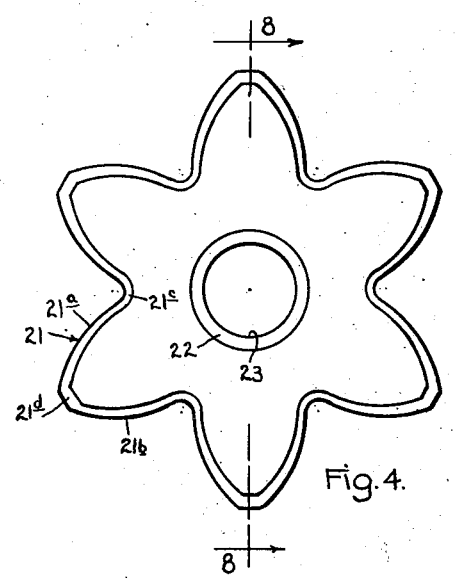
Inventor:
James Teerlink.
by [signature]
Atty.

April 5, 1960　　　J. TEERLINK　　　2,931,094
METHOD OF MAKING A SPROCKET
Filed July 29, 1957　　　　　　　　　　　　3 Sheets-Sheet 2
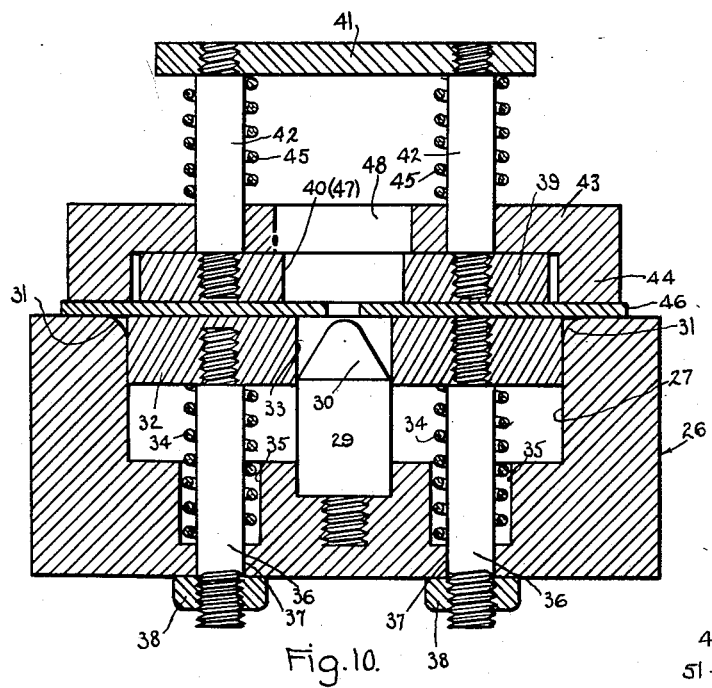
Fig. 10.
Fig. 8.
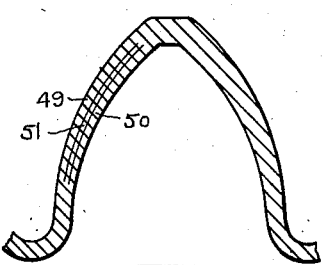
Fig. 9.
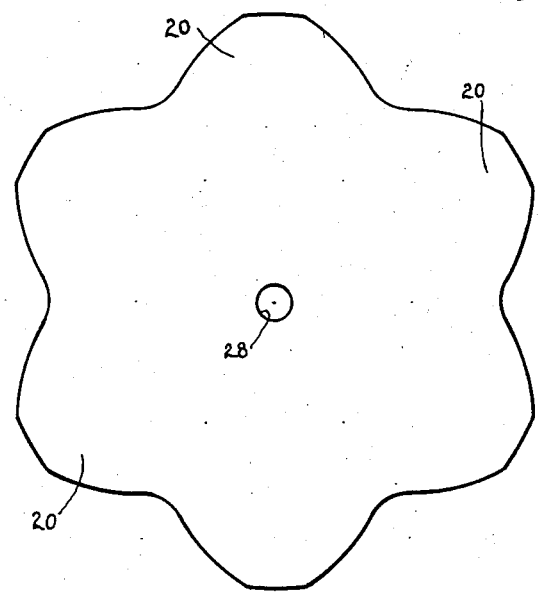
Fig. 11.
Fig. 7.
Inventor:
James Teerlink,
by April 5, 1960  J. TEERLINK  2,931,094
METHOD OF MAKING A SPROCKET Filed July 29, 1957  3 Sheets-Sheet 3

Inventor:
James Teerlink,
by
Atty.

2,931,094
METHOD OF MAKING A SPROCKET

James Teerlink, Chicago, Ill., assignor to James Teerlink, trustee

Application July 29, 1957, Serial No. 674,950

13 Claims. (Cl. 29—159.2)

This invention relates to improvements in sprockets and the manufacture thereof. Specifically, the features of the present invention have been devised, and the operations by which my improved sprockets are produced have been developed and perfected for the production of what are generally known as chain sprockets as distinguished from "contrate-wheels" in which the teeth do not carry a chain but extend axially from the body of the wheel and are meshed with teeth of a companion element. Furthermore, while sprockets embodying the features of my present invention may be used for various and many purposes for which they may have been designed, still a large field of usefulness for sprockets embodying my present invention is in connection with agricultural and like implements.

Basically the present invention concerns improved sprockets which are made from sheet metal by metal drawing and related operations, as distinguished from sprockets which have been made by casting and/or forging operations wherein the sprocket is produced by a forging of the metal block into the desired form, or by casting the molten metal into a suitable mould. Forged units can be produced to a fair tolerance in quantity operations, but such units are expensive and require the use of heavy and expensive manufacturing equipment. Cast sprockets can be more cheaply manufactured, but not to the close tolerances which are currently demanded in many fields of use, so that such cast units must be machined or otherwise perfected to be acceptable for satisfactory service over an expected useful life of more than a short interval. Such subsequent perfecting operations are expensive and involve the use of expensive equipment in order to cut the faces of the sprocket teeth to accuracy.

It is becoming recognized in various industries that many of the troubles which develop during drives by chain and sprocket operations are due to inaccuracies in tooth production of the sprockets, and in various fields of operation the expense incident to properly cutting the faces of the teeth of cast sprockets have commercially forced the use of improperly faced teeth or teeth which are not properly matched to the chains to be run over them, or which cannot be matched to any correctly designed and manufactured chain. Additionally, it is necessary to machine or otherwise finish the center bore of cast sprockets for proper fit onto the shaft or other element to which the sprocket is mounted. Such finishing of the center bore requires that the cast sprocket unit be properly centered in the finishing machine prior to executing the work of finishing. Otherwise such sprocket will run eccentrically during use. Such eccentric sprocket operation is the basic cause of much trouble, including improper running of the chain and jerky running as the sprocket comes around each rotation; but a further source of much trouble lies in the fact that in time chain breakage is directly traceable to the use of such an eccentrically running sprocket as the tension and relaxing of tension during each sprocket rotation produce serious stresses in the chain other than those incident to delivery of the intended useful load.

The prime object of my present invention is to produce the sprockets by a sheet metal drawing operation or series of drawing operations as in a progressive die stand. By such operations it is found possible to produce the sprockets to very close tolerances, and especially to produce the teeth faces to close contours which have been designed for properly running the matched chains over them. In this connection studies have recently been made respecting the running of chains over the sprocket teeth, and these studies have shown relationships between the teeth contours and the chain link spacings which relationships clearly show the importance of properly designing and accurately producing the sprocket teeth to the intended contours. It has been demonstrated in the development of my present improvements that the desired contours of the tooth faces may be repeatedly and dependably produced time after time during manufacturing operations to the close tolerances needed to ensure substantially perfect running of the chain links over the sprocket teeth, with complete avoidance of the troubles already mentioned respecting improper matching of the sprocket teeth to the chain links, even when attempts are made to produce the sprockets to stated specifications and according to previously practised commercially feasible operations. That is to say, by my improved method and operations I am able to dependably produce as commercial operations, sprockets to the desired and necessary closeness of tolerances to ensure proper matching to the chains and smooth and proper running. My operations make these results possible without the need of resorting to expensive and otherwise undesirable machining or like operations.

It is also to be noted that, since I am able to produce the sprockets by sheet metal drawing operations it is also possible to select from a large number of specifications of the sheet metal, that specification which is best adapted to meet the final specifications to which the sprockets are to be made. This is in itself a great advantage over conventional sprocket producing operations in which the metal used in the production of the elements must be selected from a very much smaller group of available metals for the conventional operations.

A further and important feature of my present invention is that the sprockets produced by and under it are much lighter than conventional cast or other solid sprockets. The sprockets herein disclosed are formed of comparatively thin sheet metal, only of sufficiently thick gauge to meet strength and manufacturing requirements, and accordingly a sprocket of my improved design contains only a fraction of the metal contained in conventional solid sprockets. Nevertheless it is of full strength needed for the intended loads and durability in continuous operation.

Since my improved sprockets are formed of sheet metal they are hollow—that is, each sprocket unit is produced as a single element, closed at one face and open at the other face—cup-like. Such a single sprocket element may be used singly if it has been produced for the full specified tooth width, and when so used, the element may be formed during the drawing operations with a hub portion which may be mounted directly on and secured to the shaft for drive. On the contrary, if desired two such cup-like elements may be set together, with their concave surfaces together, so that a complete and hollow sprocket is produced. Various arrangements may be used for joining such two elements together, including welding or brazing or other suitable operations; or such two elements may be held together by suitable fixtures in connection with the means by which the sprocket is secured to the shaft.

I have, in the drawings, shown several alternative arrangements.

If desired the formed sprocket elements may be drawn through a finishing die to smooth their chain link bearing faces but without substantial change of the contours of such faces. Any such supplemental operation, however, relates merely to the production of a smoother finish of the tooth face but without material modification of its contour, although, if desired such further contour modification might be thus produced in special cases. Any such operation, is however, not comparable in complexity or difficulty of performance with machining the tooth faces to produce specified contours, such as I have mentioned in connection with cast sprockets in which the very casting operation itself produces irregularities of wholly unacceptable kind and value.

The thickness or gauge of the sheet metal used in production of the blanks which are to be formed by drawing operations will necessarily depend largely on the size of the elements to be produced. A satisfactory thickness for sprockets of sizes up to at least six or eight or more inches pitch diameter, is about one-eighth inch. Metal of that thickness can be satisfactorily formed into the sprocket teeth without excessive deformations of the metal. For larger sizes it may be found desirable to use a thicker gauge, but even then the larger tooth sizes will generally allow for proper metal forming without excessive "working" of the metal nor excessive die stresses.

In some cases it may be found desirable to pre-heat the sheet metal blanks or the sheet metal from which such blanks are formed, and prior to the die forming operations. In such cases temperatures as high as 1200–1300 degrees F. may be used, thus greatly facilitating the forming operations, and preferably such temperatures should be used in connection with water, air, or oil cooled dies.

Since the working pressures existing between the sprocket teeth and the chain bars are developed against such tooth faces, I have made provision for reinforcing the wearing qualities and toughness of such faces when necessary. Primarily it is desirable to harden such faces to effectively resist wear; but such hardened faces should be well backed by metal of great toughness and not brittle so as to take the shocks incident to the continuous riding of the chain links against the teeth. It has been shown in this art that it is desirable to so match the sprockets with the chain running over them that at the driving sprocket end of the unit the driving force is developed by the first tooth of the driving sprocket, with successively increasing clearances between the other teeth of such driving sprocket and the chain bars, up to the opposite side of the sprocket where the chain runs off to its tangent to the other or driven sprocket. Accordingly, such first tooth should always take the load of the chain and must therefore be correspondingly hard faced and backed by a sufficiently tough and strong backing. Contrarily, at the driven sprocket it is the last tooth which takes the load, being the tooth just leaving the sprocket. Thus the wear and strength qualities of this driven sprocket should conform to the conditions already stated respecting the teeth of the driving sprocket of the pair.

One feature of my present invention concerns itself with the production of tooth qualities to meet the foregoing stated requirements. Since the sprocket wheel is formed from relatively thin sheet metal I have found it desirable to harden the tooth faces by a surface hardening operation, such as by the use of cyanides, carburizing operations, and other like surface hardening processes which are well known in the metal arts. If desired, only the teeth may be hardened by heat operations. To this end such teeth may be very quickly treated by an induction process, so that the heat penetrates only part way through the metal of such teeth for surface hardening of them. For example, in the case of teeth having a thickness of the order of 1/8 inch, more or less, the induction heating may extend through substantially 1/32 inch of the thickness, measured from the bearing surface. Then such teeth may be quenched by suitable liquid such as water or oil according to well understood operations. By this operation there is produced a thin layer of hardened surface metal, to take the wear of the sprocket chain bars, such hardened surface being well backed by the remaining thickness of the tooth metal. Thus shock will be effectively resisted, and also proper provision made for taking care of wear. When such a hardening operation is used as the cyanide or carburizing operation, it may act on both the outer and inner surfaces of the teeth, care being taken to limit the penetration to about 1/16 or 1/32 inch at both the outer and inner surfaces of the tooth metal, leaving an intermediate thickness of substantially 1/16 to 1/32 inch of relatively soft but tough metal as a backing. In any case it is possible to harden the wearing surfaces to about a hardness of 58–62 on the Rockwell "C" scale, the original sheet steel being of what is conventionally known as 1.015 carbon steel, having 10–15 "points" carbon, and having a hardness of substantially 80 on the Rockwell "B" scale.

It is here emphasized that such hardening treatments for the sprocket are readily produced on such teeth when the teeth are produced from sheet metal and according to my presently disclosed operations.

It is also pointed out that the "working" of the sheet metal for production of the sprocket contour of itself also produces a hardening of the metal, especially at its surfaces which are drawn against the dies during the forming operations.

The production of the sprockets by my present improvements is not limited to the smaller sizes for which sheet metal thicknesses of upwards of 1/8 inch are suitable. My present improvements are also satisfactorily usable for the production of larger size heavy duty sprockets for which operations sheet metal of upwards of 1/4 inch thickness or more, must be used. In such cases it may be found desirable or even necessary to use the blanks pre-heated as much as to 1200–1300 degrees F., as already explained. For the production of such larger heavy duty sprockets it may be desirable to use carbon steel or alloys but the use of carbon steel of as much as 1.040–1.045 carbon is feasible. The carburization or like surface hardening operations cannot be used for steels of more than 1.015 (15 "point") carbon. Consequently such surface hardening of the heavier gage steels needed for production of large heavy duty sprockets is not feasible when such steels are of specifications of the order of 1.040–1.045 carbon.

However, by using such steels as of upwards of 40–45 "points" carbon for production of such larger heavy duty sprockets as sheets of heavier gauge such as upwards of 1/4 inch or more, such larger heavy duty sprockets may be produced by my improvements, pre-heating the blanks to 1200–1300 degrees F., drawing the sprockets in the dies, and then hardening the elements by suitable quenching or like operations.

Other objects and uses of the invention will appear from a detailed description of the same, which consists in the features of construction and combinations of parts hereinafter described and claimed.

In the drawings:

Figure 1 shows a plan view of a conventional form of sprocket known as a "55" sprocket;

Figure 2 shows a plan view of another conventional form of sprocket known as a "62" sprocket;

Figure 3 shows a plan view of a typical sprocket formed according to my present operations, being a "front" face view, that is, a view looking at the outer or convex surface of the formed sprocket element.

Figure 4 shows a plan view of the sprocket shown in Figure 3, but looking at the cup face or concave thereof, being a simple form of sprocket embodying the features of the present invention and having a hub element for mounting directly on the shaft;

Figure 5 shows an edge view of the sprocket shown in Figures 3 and 4 after trimming the drawn edge thereof;

Figure 6 shows a view similar to that of Figure 5, but showing the edge of the sprocket before trimming the same, so that the edge shown in this figure is serrated or irregular as produced by the drawing operations;

Figure 7 shows a view similar to that of Figure 5, but with two of the elements of Figure 5 set together edge to edge, and in such relation they may be joined together in suitable manner, as by welding or other suitable processes to hold the elements rigidly together and with their teeth in exact alignment;

Figure 8 shows a cross-section taken on the line 8—8 of Figures 3 and 4, looking in the directions of the arrows;

Figure 12:
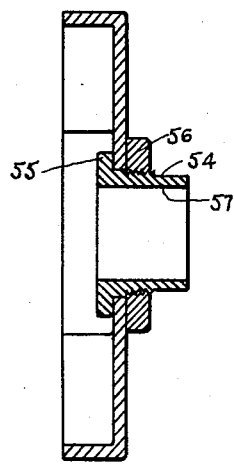
Figure 13:
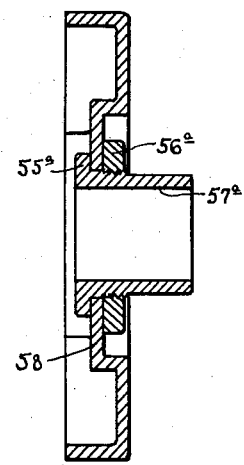
Figure 14:
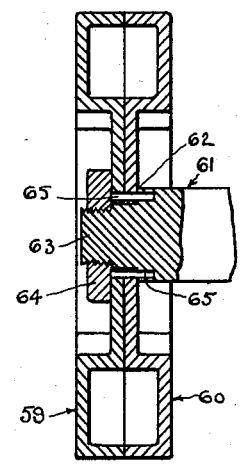
Figure 16:
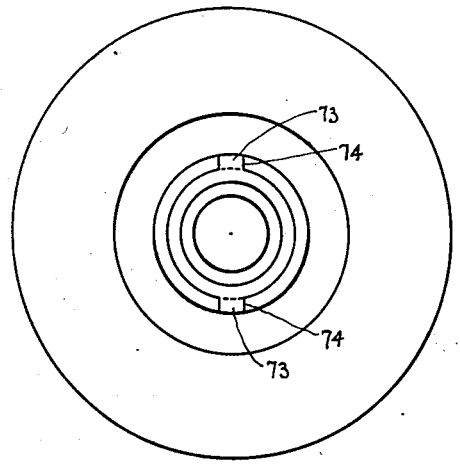
Figure 15:
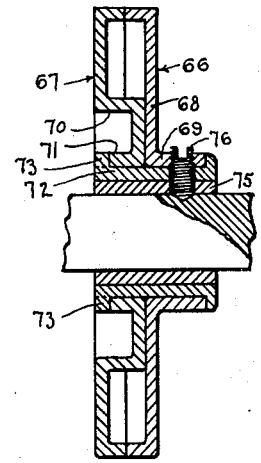

Figure 9 shows on double scale as compared to Figures 3 to 7, inclusive, a detailed section through one of the sprocket teeth, showing how the hardening may be produced inwardly from both the outer and inner surfaces of the tooth, leaving the middle section of the sheet metal unhardened but still endowed with great strength and toughness and serving as a backing for the hardened surface or surfaces;

Figure 10 shows, more or less schematically, a simple form of press for producing a sprocket of the form shown in Figures 3 to 9, inclusive;

Figure 11 shows the general form of a sheet metal blank which may be used for forming the sprocket of the general form of Figures 3 to 9, inclusive, and by use of a press such as shown in Figure 10;

Figure 12 shows a section through a sprocket element of the type shown in Figures 3, 4, 5, 6, 8 and 9 which may be mounted on and secured in simple manner to a shaft;

Figure 13 shows a view similar to that of Figure 12, but illustrating a sprocket element of modified form in which the central portion of such sprocket element is offset inwardly by the drawing operations to bring such central portion into substantial alignment with the planar center of the sprocket, thus providing a balanced support for the peripheral tooth carrying portion of the sprocket;

Figure 14 shows another modified embodiment of my invention in which two of the sprocket elements of the type shown in Figure 13 have been set edge to edge and jointly mounted on the shaft;

Figure 15 shows still another modified form of the sprocket in which still other forms of sprocket element have been set together edge to edge and supported on the shaft by a common support, such two elements being also spot welded together;

Figure 16 shows a left-hand end view of the element of Figure 15.

Referring first to Figures 1 and 2, I have therein shown in outline two forms of sprocket and tooth design and form, conventionally designated as "55" and "62," respectively. These sprockets are designed to match with conventional forms of chain of different separations between the link bars of successive links; and the teeth of the showing in Figure 1 have been modified by cutting off the outer tooth ends and rounding the same for better entrance and departure of the chain link bars onto and from the sprocket. It has been found that a sprocket design is feasible which will carry both sizes of chains for which the sprockets of Figures 1 and 2 were designed. Such a sprocket design has been illustrated in Figures 3, 4, 5, 6, 7, 8 and 9 which illustrate a sprocket element according to my present invention.

The sprocket element of Figures 3 to 9, inclusive, is formed from a blank of the general form shown in Figure 11. The schematic form of drawing press by which such blank may be converted to the sprocket element will be described presently. It is shown in Figure 10. The blank of Figure 11 has the radially extending lug portions 20 corresponding to the sprocket teeth to be produced. The perimeter of such blank is larger than the overall radial dimensions of the sprocket to be produced, by the amount necessary to provide for the edge which will be turned up from the central portion of the blank, which edge will produce the teeth. Such upturned edge is shown at 21 in Figures 4, 5, 6 and 8, and elsewhere. It is noted that the thickness of such flange or edge may be varied as desired during the drawing operation, and in Figure 4 the working faces 21$^a$ and 21$^b$ of each tooth are thicker than the radially inward portions 21$^c$ which connect the roots of the successive teeth together. I shall hereinafter refer again to these portions 21$^c$ which are also turned up from the periphery of the central portion of the blank during the drawing operation, and said portions 21$^c$ are integral with and connected to the inner or root portions of the flanges 21$^a$ and 21$^b$ of the proximate teeth. Said upturned portions 21$^c$ are also curved and have their concave surfaces facing radially outward, being in the form of fillets between the successive tooth roots. Said fillet portions thus directly connect together the roots of successive teeth, giving great added strength to the root portions of the teeth. The rounded or fillet forms of these portions 21$^c$ enable them to be formed without tearing the metal of the blank during the drawing operations. Also, the outer peripheral portions 21$^d$ are slightly thinner than such working faces 21$^a$ and 21$^b$. The exact thicknesses of various portions of the flange or edge produced by the drawing operations may be controlled by the designs of the male and female dies, presently to be described. There is also shown the upturned central ring shaped flange 22 surrounding the shaft opening 23. Such central ring shaped flange provides a hub element by which the sprocket element may be mounted on the shaft which receives it. Here it is noted that the drawing operations may be readily carried on under such conditions of control that such hub will seat on the specified shaft size without need of further machining or finishing operations than those of the drawing operations. Reference has previously been made to this fact.

During the drawing operations the flange or edge portion 21 may come out unevenly or irregularly, with a rather "scalloped" form, such as shown at 24 in Figure 6. It is therefore intended that, if necessary, the blank of Figure 11 shall originally be of somewhat oversize so that during the drawing operation no part of such scallop shall be of less vertical dimensions than the intended final dimension of the teeth, measured in axial direction. Then after the drawing operation has been completed the edge portion 21 may be cut off to the correct axial dimension, bringing the element into the form shown in Figures 5 and 8. The additional metal thus rejected is of small proportion of the total used for the blank. Preferably the hub flange 22 will also be drawn to an excess axial dimension, and afterwards cut off with the cutting operation produced on the tooth flanges. In Figure 6 the cut-off line is shown by the dashed line 25.

In connection with the foregoing, however, it is noted that it will sometimes be desirable to weld two of the elements together edge to edge by what is conventionally known as "projection resistance welding" operations. In such operations one or both of the edges to be welded together is or are provided with small projections or teats which will contact the edges of the companion elements with a high resistance contact. Then by passing a sufficiently heavy electric current between the two elements and through such so contacting high resistance teat contacts a welding temperature is quickly developed. Then the two elements may be forced strongly together to produce the final welding operation and bring the two elements finally into full edge to edge relationship, and the current may be cut off. The teats, when such a projection resistance weld is to be produced, may be produced by a "spanking" operation during or at conclusion of the drawing operations. In such cases, also, the drawing operation should be so conducted that any scallops such as above referred to shall be of negligible size so that the edges of the drawn elements shall not need to be cut off as previously explained.

Reference may now be made to Figure 10 as schematically illustrative of a simple form of draw press capable of producing the drawing operations to convert the blank of Figure 11 to the sprocket of other figures:

The female die block is shown at 26. It is provided with the female recess 27 of size substantially the same as the outer perimeter 21ª, 21ᵇ, 21ᶜ and 21ᵈ of the finally to be produced teeth (see Figure 4). The blank of Figure 11 is also provided with the central opening 28 from which the shaft opening and flange 22 are to be drawn. The stand 29 extends up from the center of the floor of the female die recess, such stand being conveniently set into a threaded socket of such floor. The upper end of this stand is tapered as shown at 30 with the extreme upper end of such taper small enough to start the spreading of the metal blank during the down pressing movement of the male die, presently to be described. The upper edge of the female die is rounded on an easy fillet 31 to assist the movement of the metal of the blank into the peripheral portion of the female die during the drawing operation.

Mounted within the female die recess there is also the ejector block 32. This block is of peripheral contour to fit nicely for free vertical movement up and down within the female die recess. Such block is provided with the central opening 33 to accommodate the stand 29 which remains stationary. Several strong compression springs 34 have their lower ends received in sockets 35 in the floor of the female die recess, and the upper ends of these springs bear against the lower face of the ejector block and urge it upwardly with sufficient force to maintain a strong pressure against the bottom face of the blank of sheet metal during the drawing operation, thus providing good control of such blank during that operation. After the drawing operation has been completed, the ejector block being down into the recess and the springs compressed, such ejector block has come to seat on the floor of the recess, thus preventing further descent of such ejector block. The sockets 35 in the floor of the female die recess are deep enough to fully accommodate the springs without completely closing the convolutions of such springs, so that the ejector block may thus come to its dead seat against the floor of the female die recess. At that time the male die, presently to be described may be subjected to such force as may be necessary to bring the blank into its final and accurately formed contour, it being noted that the accuracy of production of the sprocket teeth is much dependent on this final pressing operation of the male die after the ejector block has come to its dead seat.

A rod 36 carried within each of the compression springs 34 has its upper end secured to the lower face of the ejector block, as by threading therein. Each such rod extends down within its companion spring and through an opening 37 in the floor of the corresponding socket 35 so that such rod rides up and down with the ejector block. A stop abutment, in the form of a nut 38 is carried by the lower end of each rod 36, and may be brought to position on such rod, as by threading, that such abutment element comes against the lower face of the female die just as the ejector block reaches its intended upper limit of movement. The upper limit is a position in which the top face of the ejector block is flush with the top face of the female die block, being the position shown by these parts in Figure 10. The springs are preloaded at the time they are set into the unit, so that even when the ejector block has come to its upper limit of movement such springs exert large upward forces on the ejector block. Thus, when the male die first engages the top face of the blank it must develop a large compressive force against the blank in addition to that required to force the blank into the recess of the female die. Thus a good control is ensured on the blank at the time the forming operation commences.

The male die is shown at 39. It is of contour the same as the inner perimeter of the flange or edge portion 21, and thus the contour of such male die is shown by reference to Figure 4. It is also thus apparent that such male die is of size smaller than the size of the recess of the female die by substantially the thickness of the sheet metal blank. However, in some portions of its perimeter such male die may be slightly larger than the size just stated, so that some of the metal of the blank being worked at such locations must be crowded to adjacent locations, which should be designed to receive such transferred metal. This male die is also provided with the central opening 40 of size to accommodate the stand 29 as the male die descends to its final position. A presser plate 41 is located above the male die, and the rods 42 extend between such presser plate and such male die so that downward movement of the presser plate is directly communicated to such male die.

A follower plate 43 has its perimeter formed of contour generally the same as the perimeter of the blank shown in Figure 11, and provided with the downwardly extending flange 44. The rods 42 extend through suitable openings of the top of such follower plate, so that the follower plate is free to remain stationary while the presser plate 41 and rods 42 and male die all move down, the follower plate remaining stationary. Strong springs 45 are provided around the rods 42. They have their upper and lower ends against the presser plate 41 and the follower plate 43. Thus, during downward movement of the presser plate and the male die, the follower plate 44 may remain stationary in contact with the top surface of the sheet metal blank, holding such blank's peripheral portion firmly pressed against the top surface of the female die. Such blank is shown at 46 in Figure 10. The springs 45 are heavily preloaded so that as soon as down movement of the male die commences, moving down from the follower plate, the full pre-load of the springs 45 being then exerted against the peripheral portion of the blank.

Both the male die and the follower plate are provided with openings 47 and 48 to receive the upper end of the stand 29 as the presser plate and male die are driven down.

After full descent of the presser plate and male die the presser plate is allowed to rise under urge of the springs 45, until the male die engages the lower surface of such presser plate. Then further raising of the presser plate will raise the peripheral portion of such follower away from the top surface of the female die, the formed sprocket element having been raised out from the female die.

The exact form of the sprocket unit may be the simple form shown in various of the figures already referred to. Other forms will be described hereinafter.

In Figure 9 I have shown, on enlarged scale, a section through one tooth of the sprocket element. I have therein indicated the hardened outer layers 49 and 50, with the intermediate layer 51 of non-hardened metal which constitutes a tough backing for the hardened surfaces.

In Figure 7 I have shown two of the sprocket elements 52 and 53 set together edge to edge to produce a double size unit, with double areas of the sprocket teeth. These two elements may be welded together into an integral sprocket as already explained. Other forms of the elements will now be described as follows:

In Figure 12 I have shown a single element of the form already described, together with a thimble 54 forming a hub element in place of the neck portion 22 of previous showings. This thimble is provided with the end flange 55 which seats against the inside surface of the sprocket element, and a nut 56 is then threaded onto such thimble and against the outer surface of the sprocket element. The bore 57 of such thimble is of proper size to accommodate the shaft with which the sprocket is intended to be used.

In the embodiment shown in Figure 13 the sprocket element has its central portion 58 offset leftwardly to a position substantially in register with the planar central section of the element, thus producing a well balanced element in which the lateral forces developed by chain pull on the sprocket do not tend to rock the sprocket itself about the medial point of such sprocket. In other respects this arrangement is similar to that of Figure 12; and for convenience I have therefore legended like parts of the two arrangements with like numerals, but with the addition of the suffix "$a$" in the case of Figure 13.

In Figure 14 I have shown an embodiment including the two elements 59 and 60, each of which is similar to the offset element shown in Figure 13, such two elements being set together edge to edge for production of a combined sprocket of double tooth area. The thimble element 61 is shouldered at 62 to receive the end thrust of the element 60, and the end portion of the thimble is of reduced size 63 to extend through the central portion of the element 59, being then threaded to receive the clamping nut 64 by which both of the elements are clamped firmly together and against the shoulder 62. Aligning dowel pins 65 are set through the central portions of both elements to hold them in alignment, and to ensure that they maintain exact angular registry during running. It is thus unnecessary to weld the two elements together.

In Figures 15 and 16 I have shown an embodiment composed of two units 66 and 67. The element 66 is formed with the straight section 68 extending from the hub portion or flange 69 to the peripheral toothed section. The element 67 is provided with the reversely formed central section 70 having the inner hub section 71 and the outer peripheral section of toothed form which comes edge to edge with the corresponding toothed portion of the element 66. Both of the hub sections 69 and 71 are set onto a sleeve 72 to which they have a nice fit; and such sleeve is provided with an outwardly formed lug 73 which is received by a corresponding notch 74 of the hub portion of the element 67 when such element is correctly registered angularly therewith. This locks such element 67 to such sleeve and against relative rotations between such parts. Having set both of the elements 66 and 67 onto such sleeve their central portions some into facial engagement as shown in Figure 15. Thereupon these facially engaging parts may be spot welded together while the two elements are in correct angular registry so that their teeth correctly register with each other. Having thus welded the two elements together, both being also set onto the sleeve, the right-hand end of such sleeve may be riveted over the exposed right-hand end of the hub portion 69 of the element 66, thus locking both elements to the sleeve. By the engagement of the lug 73 with the notch of the element 67 they are drivingly connected to the sleeve. If desired the hub opening of the sleeve may be made oversize so that it can be set onto either of two or more shaft sizes; and in Figure 15 I have shown the adapter 75 set into such oversize sleeve to take care of the necessary amount of clearance around the shaft with which the sprocket is to be used. Then a set screw 76 may be set through the hub portion of the sprocket, through the sleeve, and into the adapter to lock all such parts together and to the shaft.

It is evident that each of the foregoing forms of the sprocket element is of such contour and section that it can be produced by die forming operations, since each of such embodiments may be withdrawn from the female die after the operation, and also the male die can be properly functioned in each case. Various other embodiments of my present invention are also possible, but the foregoing will illustrate the wide diversity of possible embodiments, all within the scope of my present invention.

The draw press shown schematically in Figure 10 is shown by way of illustration, only. I do not intend to limit myself thereto. Thus, various forms of four or even five stage progressive die stands may be used to carry on the complete operations, depending on the sizes of the sprocket elements to be made, the thicknesses of the sheet metals to be treated, details of design and various other factors.

I wish to point out that my method or process of producing the sprockets by a drawing operation is novel and distinctive in several respects. These are directly related to the fact that by my operations I am able to start the drawing operation from a blank such as shown in Figure 11 wherein the lugs 20 are of sufficient angular dimension to produce the metal needed for the sides $21^a$ and $21^b$ of the teeth, and are of sufficient radial dimension to produce the outer ends of faces $21^d$ of the teeth, and wherein the inner or "root" ends of said lugs are joined by rounded connection portions, being parts of the circular body of the blank at locations between the roots of the teeth, which portions are of greater radius (measured from the center of the blank) than the radii of the flange portions $21^c$ of the finally produced drawn sprocket. Thus, during the drawing operation the metal of the rounded portions or roots of the lugs 20 of the blank of Figure 11 is stretched as it is drawn into form normal to the plane of the central portion of the blank to form the flange portions $21^c$ of the sprocket section. This stretching operation reduces the thickness of such portions $21^c$ as shown in Figure 4, but this operation is not of sufficient degree to rupture the flange $21^c$ between the root portions of the two proximate teeth.

Next, during the drawing operation the larger diameter (measured from the center of the blank of Figure 11) ends of the tooth portions of such blank are drawn into the flange portions $21^d$ of the drawn sprockets. During this operation the metal of said end portions is thus crowded into a body of smaller radius (measured from the center of the blank of Figure 11) than its original radius. Thus some metal must be transferred to flange portions of smaller radius (measured from the center of the blank of Figure 11) than previous to the drawing operation. Thus either or both of two operations must occur. Either the thickness of the outer end portion $21^d$ of the tooth flange must be increased, or the thicknesses of the side walls $21^a$ and/or $21^b$ of the tooth flanges must be increased, or both of said results must be produced. I prefer in any case to cause a thickening of the flange portions $21^a$ and $21^b$ as shown in Figure 4, and in more detail in Figure 9. This result is produced by properly designing the male and female dies so that the clearances between them at the locations where the side walls $21^a$ and $21^b$ of the tooth are to be produced are slightly greater than the original thickness of the stock from which the blank was cut. Then, during the drawing operation some metal is forced from the outer end portion of each of the lugs of the blank backwardly to smaller radius locations (measured from the center of the blank of Figure 11) into such larger clearance locations, thereby producing at least some of the increase in thickness of the side portions $21^a$ and $21^b$ as shown in said Figures 4 and 9.

By the foregoing operation the teeth of the drawn sprocket are thickened in their side walls $21^a$ and $21^b$, being the tooth locations where the cross-bars of the chain exert pressure against the teeth, and thus also subject to wear during the running of the chain over the sprocket. After the drawing operations said thickened portions $21^a$ and $21^b$ may have their outer (and, if desired, their inner) surfaces hardened, as already explained.

It is also seen that such drawing operation from a blank of the general form shown in Figure 11 results in production of a unitary, integral sprocket element in which said element is of generally cup shape, including an annular end plate normal to the axis of rotation of the sprocket, together with integral end portions for all of the so-formed teeth, the tooth flanges 21ª, 21ᵇ and 21ᵈ comprising drawn edge portions of said tooth end portions. Thus the flanges which comprise the tooth working faces are of stiffness due to their integration with the tooth end portions, and due to the outer end connecting flange portions 21ᵈ, and due to the inner connecting flange portions 21ᶜ from tooth to tooth, as well as the inherent stiffness of said working face flange portions 21ª and 21ᵇ due to their increased thickness.

I claim:

1. In the art of producing sprockets, a method of producing a sprocket to tooth contours of prescribed specifications from sheet metal by a die drawing operation, comprising forming a sheet metal blank including a generally circular body portion having a plurality of radially extending tooth producing projection portions of contour generally corresponding to the sprocket teeth to be produced, each such projection portion being of greater size than the cross section of the tooth to be produced from such projection portion around the entire perimeter of such projection portion which is radially outward from the circular body portion, and the circular body portion of the blank being of greater radial dimension at each location between proximate projection portions than the radial dimension of the valley to be produced between the proximate teeth from such projection portions, the excess size of the perimeter of each projection portion being at all locations around such perimeter at least as great as the axial dimension of the tooth to be produced from such projection portion, and the excess radial dimension of each location between proximate projection portions being at least as great as the axial dimension of the valley to be produced between the proximate teeth to be produced from such projection portions, and which operations include forcing such blank by pressure of a male die into a female die having a recess whose perimeter surface includes areas corresponding to the side walls and outer ends of the sprocket teeth and which side wall areas substantially conform to the contours of the outer surfaces of the sprocket teeth, and which recess includes areas substantially conforming to the contours of the valleys between proximate sprocket teeth, and which male die has a perimeter surface which substantially conforms to the contours of the inner surfaces of the sprocket teeth to thereby draw the perimeter portions of the blank into axial relation to the body of the blank and with the outwardly facing surface portions of such axially drawn perimeter portions formed on contours substantially the same as the contours of the perimeter surface elements of the female die, the male die including radially outwardly extending portions corresponding to sprocket teeth producing portions of the contour of the female die recess, said outwardly extending portions of the male die being of smaller cross section than the cross sections of the corresponding portions of the female die recess and leaving clearances between the walls of said outwardly extending male die portions and the proximate surfaces of the recess of the female die, said clearances between the radially extending surfaces of the male die projections and the proximate surfaces of the female die recess being greater than the thickness of the blank to be drawn between said male and female die portions to receive metal flowed radially from portions of the blank adjacent to said greater thickness portions of the clearance between the female die recess and the male die portions.

2. A method as defined in claim 1, wherein the clearances between the radially extending surfaces of the male die projections and the proximate surfaces of the female die recess which are greater than the thickness of the blank, include die areas which produce the working surfaces of the teeth of the sprocket.

3. In the art of producing sprockets, a method of producing a sprocket to tooth contours of prescribed specifications from sheet metal by a die drawing operation, comprising producing a sheet metal blank including a generally circular body portion having a plurality of radially extending tooth producing projection portions of contour generally corresponding to the sprocket teeth to be produced, each such projection portion being of greater size than the cross section of the tooth to be produced from such projection portion around the entire perimeter of such projection portion which is radially outward from the circular body portion, and the circular body portion of the blank being of greater radial dimension at each location between proximate projection portions than the radial dimension of the valley to be produced between the proximate teeth from such projection portions, the excess size of the perimeter of each projection portion being at all locations around such perimeter at least as great as the axial dimension of the tooth to be produced from such projection portion, and the excess radial dimension of each location between proximate projection portions being at least as great as the axial dimension of the valley to be produced between the proximate teeth to be produced from such projection portions, and which operations include forcing such blank by pressure of a male die into a female die having a recess whose perimeter surface includes areas corresponding to the side walls of the sprocket teeth and which side wall areas substantially conform to the contours of the outer surfaces of the sprocket teeth, and which recess includes areas substantially conforming to the contours of the valleys between proximate sprocket teeth, and which male die has a perimeter surface which substantially conforms to the contours of the inner surfaces of the sprocket teeth to thereby draw the perimeter portions of the blank into axial relation to the body of the blank and with the outwardly facing surface portions of such axially drawn perimeter portions formed on contours substantially the same as the contours of the perimeter surface elements of the female die, the male die including radially outwardly extending portions corresponding to sprocket teeth producing portions of the contour of the female die recess, said outwardly extending portions of the male die being of smaller cross section than the cross sections of the corresponding portions of the female die recess and leaving clearances between the walls of said outwardly extending male die portions and the proximate surfaces of the recess of the female die.

4. A process as defined in claim 3, wherein the male and female dies also include cooperating elements of form to produce an axially extending projection from the central portion of the blank, for cooperation with shaft mounting means for the sprocket element.

5. A process as defined in claim 4, wherein said projection from the central portion of the blank projects in the same direction axially from the body of the blank as the teeth.

6. A process as defined in claim 3, which process also includes the further step of surface hardening the outwardly facing working surfaces of the sprocket teeth.

7. A process as defined in claim 6, wherein such surface hardening of the sprocket teeth extends to a depth of the thickness of sheet metal not greater than substantially one-half the thickness of such metal.

8. A process as defined in claim 1, wherein the male and female dies also include cooperating elements of form to produce an axially extending projection from the central portion of the blank, for cooperation with shaft mounting means for the sprocket unit.

9. A process as defined in claim 8, wherein said projection from the central portion of the blank projects in the same direction axially from the body of the blank as the teeth.

10. A process as defined in claim 1, wherein the perimeter portions of the blank are drawn to a depth at least as great as the axial dimensions of the teeth specifications.

11. A process as defined in claim 10, wherein the perimeter portions of the blank are drawn to a depth greater than the axial dimensions of the teeth specifications, and which operations also include cutting off such drawn perimeter portions on a plane normal to the axis of the sprocket at a distance from the body of the blank corresponding to the specified axial dimension of the sprocket teeth.

12. A process as defined in claim 2, which process also includes the further step of surface hardening the outwardly facing working surfaces of the sprocket teeth.

13. A process as defined in claim 12, wherein such surface hardening of the sprocket teeth extends to a depth of the thickness of the sheet metal not greater than substantially one-half the thickness of such metal.

References Cited in the file of this patent

UNITED STATES PATENTS

| | | |
|---|---|---|
| 665,949 | Albert | Jan. 15, 1901 |
| 985,905 | Johnston | Mar. 7, 1911 |
| 1,085,090 | Lachman | Jan. 20, 1914 |
| 1,510,889 | Hooker | Oct. 7, 1924 |
| 1,847,926 | Chase | Mar. 1, 1932 |
| 2,038,475 | Brown | Apr. 21, 1936 |
| 2,177,303 | Murden | Oct. 24, 1939 |
| 2,412,114 | Zonis | Dec. 3, 1946 |
| 2,556,236 | Strickland | June 12, 1951 |
| 2,564,906 | Kincaid et al. | Aug. 21, 1951 |
| 2,654,944 | Wilson | Oct. 13, 1953 |
| 2,800,031 | Schultz | July 23, 1957 |

FOREIGN PATENTS

| | | |
|---|---|---|
| 903,963 | France | Feb. 12, 1945 |